(12) United States Patent
Holmes et al.

(10) Patent No.: US 7,305,374 B2
(45) Date of Patent: Dec. 4, 2007

(54) METHOD, SYSTEM AND PROGRAM PRODUCT FOR AUTOMATED TESTING OF CHANGES TO EXTERNALIZED RULES

(75) Inventors: Peter Holmes, Poughkeepsie, NY (US); Joshy Joseph, Redmond, WA (US); Aron T. Lien, Belmont, CA (US); Emily M. Wasser, Potomac, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/339,929

(22) Filed: Jan. 26, 2006

(65) Prior Publication Data

US 2007/0174223 A1    Jul. 26, 2007

(51) Int. Cl.
G06F 17/00 (2006.01)
G06N 5/02 (2006.01)
(52) U.S. Cl. .............. 706/47; 706/59; 706/61
(58) Field of Classification Search .............. 706/47
See application file for complete search history.

(56) References Cited

U.S. PATENT DOCUMENTS

| | | | |
|---|---|---|---|
| 5,673,387 | A | 9/1997 | Chen et al. |
| 6,415,396 | B1 | 7/2002 | Singh et al. |
| 2002/0161700 | A1 | 10/2002 | Ernst et al. |
| 2003/0018932 | A1 | 1/2003 | Blum et al. |
| 2004/0154001 | A1 | 8/2004 | Haghighat et al. |
| 2005/0050521 | A1 | 3/2005 | Chang |
| 2005/0137844 | A1 | 6/2005 | Voruganti |

OTHER PUBLICATIONS

Proctor et al., "Drools Documentation 3.0.5", Sec. 9.2, 2005.*
Earls et al., "A method for the manual extraction of business rules from legacy source code", 2002.*
Bajec et al., "A methodology and tool support for managing business rules in organizations", 2001.*
Rutherford et al., "A Case for Test-Code Generation in Model-Driven Systems", 2003.*
Carter et al., "Test Management System for Complex Software Development Environments", TDB n6b 11-90 p. 4-5 (abstract).
Gieseler et al., "Automatic Regression Facility. Aug. 1980.", TDB 08-80 p. 1139 (abstract).
Sacks et al., "Dynamic Testing of Program Data Structures. Oct. 1972.", TDB 10-72 p. 1485-1487 (abstract).
Craggs et al., "Regression Testing", TDB 11-86 p. 2514-2516 (abstract).

* cited by examiner

Primary Examiner—Anthony Knight
Assistant Examiner—Nathan H. Brown, Jr.
(74) Attorney, Agent, or Firm—Silvy Anna Murphy

(57) ABSTRACT

A method of testing changes to externalized rules is provided. The method comprises using a rules change management engine and receiving from it a test request for a rules change for a rule. Further, the method comprises providing regression test buckets for testing a version of a rule against each of a plurality of exploiting systems that exploits the rule, and determining for the test request for the rules change received, which of the regression test buckets should be executed against which of the plurality of exploiting systems that exploits the rule and running, using a test rules management system, the regression test buckets that are determined should be executed. The method further comprises reporting results of the regression test buckets that are run to the rules change management engine, such that the rules change management engine is able to determine whether or not to implement the rules change.

24 Claims, 6 Drawing Sheets

METHOD, SYSTEM AND PROGRAM PRODUCT FOR AUTOMATED TESTING OF CHANGES TO EXTERNALIZED RULES

FIELD OF THE INVENTION

The present invention relates to a method, system and program product for testing changes to rules that have been externalized from the systems that exploit them. More particularly, the present invention relates to a method, system and program product for testing changes to externalized or business rules to run regression tests against one or more test exploiting systems in order to test changes in response to a test request for changing an externalized rule.

BACKGROUND OF THE INVENTION

In today's business environment, organizations and/or businesses utilize a variety of rules engine software to maintain externalized rules, often used for business rules, which are exploited by a variety of systems. When an externalized rule is changed, this can affect multiple systems simultaneously. As such, it is imperative that organizations and/or businesses examine the efficiency and effectiveness of changing a business rule with minimal risk of interruption to the systems that utilize the externalized rule. Accordingly, there is a need to simplify the process of changing rules and at the same time minimizing the risk of unintended side effects associated with such changes.

SUMMARY OF THE INVENTION

In another embodiment, the present invention provides a method of testing changes to externalized rules. The method comprises providing regression test buckets for testing a version of a rule against each of a plurality of exploiting systems that exploits the rule by using a rules change management engine and receiving a test request for a rules change for a rule. Further, the method comprises determining for the test request for the rules change received, which of the regression test buckets should be executed against which of the plurality of exploiting systems that exploits the rule and running, using a test rules management system, the regression test buckets that are determined should be executed. Preferably, the providing step comprises the steps of defining regression test buckets for each rule of a plurality of rules, linking a unique test identifier to each of the regression test buckets that are defined, and defining any local rules that are linked to any of the regression test buckets for controlling the running of the regression test buckets. Additionally, in a preferred embodiment, the receiving step further comprises the step of receiving into a test rules management system the test request for the rules change for the rule from the rules change management engine. Preferably, the determining step further comprises the step of establishing one or more relationships between each regression test bucket of a plurality of regression test buckets and each system of a plurality of exploiting systems that exploits any rule of a plurality of rules, and between each rule of the plurality of rules and one or more regression test buckets of the plurality of regression test buckets that should be executed against each system of the plurality of exploiting systems that exploits any rule of the plurality of rules. Further, in a preferred embodiment, the running step further comprises the steps of consulting the one or more relationships to determine a relevant set of the regression test buckets that should be executed, and running, using the test rules management system, the relevant set of the regression test buckets that are determined should be executed against a plurality of test exploiting systems corresponding to the plurality of exploiting systems. The method further comprises reporting test results of the regression test buckets that are run to the rules change management engine, such that the rules change management engine is able to determine whether or not to implement the rules change for the rule based on the test results that are reported. Preferably, the method further comprises the step of creating a log of the test results that are reported. In a preferred embodiment, the method comprises linking a unique rule identifier to each rule of a plurality of rules, and linking a unique system identifier to each system of the plurality of exploiting systems that exploits each rule of the plurality of rules. Preferably, the creating step further comprises the step of storing the log of the test results that are created in a log file.

In one embodiment, the present invention provides a system for testing changes to externalized rules. The system comprises a rules engine configured to manage a plurality of rules, each rule of the plurality of rules being exploited by one or more test exploiting systems of a plurality of test exploiting systems, and a rules change management engine coupled to the rules engine, the rules change management engine being configured to update any of the plurality of rules in the rules engine. The system further comprises a plurality of test exploiting systems, each of the test exploiting systems corresponding to one of the plurality of exploiting systems. Further, the system comprises a regression test buckets file configured to store regression test buckets that are defined for each rule of the plurality of rules and a rule-system-test linkage file configured to provide a linkage between the regression test buckets that are defined for each rule and the one or more exploiting systems that exploit each rule. Preferably, each of the regression test buckets stored in the regression test buckets file is defined to correspond to one or more of the plurality of rules. Further, in a preferred embodiment, the rule-system-test linkage file is further configured to link a unique rule identifier to each rule of the plurality of rules, and to link a unique system identifier to each system of the plurality of test exploiting systems that exploits the plurality of rules, and to link a unique test identifier to each of the regression test buckets that are defined. Furthermore, the system comprises a test rules engine configured to receive a test request for a rules change for a rule in the rules engine from the rules change management engine and configured to select which of the regression test buckets from the regression test buckets file should be executed in response to the test request for the rules change and to select one or more of the plurality of test exploiting systems based on the linkage obtained from the rule-system-test linkage file and to initiate the running of the regression test buckets selected on the one or more of the plurality of test exploiting systems selected in order to test the rules change received for the rule in the test request. In a preferred embodiment, the system further comprises a test rules file configured to store a copy of the plurality of rules and a log file configured to store test results of the one or more of the regression test buckets run. Preferably, the test rules engine is further configured to report test results of the one or more of the regression test buckets that are run to the rules change management engine. Preferably, the test rules engine is further configured to create a log of the test results of the one or more of the regression test buckets run and to store the log in the log file.

In yet another embodiment, the present invention provides a method for deploying computing infrastructure, comprising integrating computer-readable code into a computing system, wherein the code in combination with the computing system is capable of performing a process of testing changes to externalized rules. The process comprises providing regression test buckets for testing a version of a rule against each of a plurality of exploiting systems that exploits the rule by using a rules change management engine and receiving a test request for a rules change for a rule. Further, the process comprises determining for the test request for the rules change received, which of the regression test buckets should be executed against which of a plurality of test exploiting systems that correspond to the plurality of exploiting systems that exploits the rule, running the regression test buckets that are determined should be executed, creating a log of the test results that are reported and reporting test results of the regression test buckets that are run to the rules change management engine, such that the rules change management engine is able to determine whether or not to implement the rules change for the rule based on the test results that are reported. In a preferred embodiment, the process further comprises linking a unique rule identifier to each rule of the plurality of rules and linking a unique system identifier to each system of the plurality of exploiting systems that exploits each rule of the plurality of rules. Preferably, the providing step further comprises the steps of defining regression test buckets for each rule of a plurality of rules, linking a unique test identifier to each of the regression test buckets that are defined, establishing one or more relationships between each regression test bucket of a plurality of regression test buckets and each system of a plurality of exploiting systems that exploits any rule of a plurality of rules, and between each rule of the plurality of rules and one or more regression test buckets of the plurality of regression test buckets that should be executed against each system of the plurality of exploiting systems that exploits any rule of the plurality of rules, and defining any local rules that are linked to any of the regression test buckets for controlling the running of the regression test buckets. In a preferred embodiment, the receiving step further comprises the step of receiving into a test rules management system the test request for the rules change for the rule from the rules change management engine. Preferably, the running step further comprises the step of running, using the test rules management system, the regression test buckets that are determined should be executed against a plurality of test exploiting systems which correspond to the plurality of exploiting systems that exploits the rule, and preferably, the creating step further comprises the step of storing the log of the test results that are created in a log file.

In a further embodiment, the present invention provides a computer program product for testing changes to externalized rules. The computer program product comprises a computer readable medium and first program instructions to establish one or more relationships between each regression test bucket of a plurality of regression test buckets and each system of a plurality of exploiting systems that exploits any rule of a plurality of rules, and between each rule of the plurality of rules and one or more regression test buckets of the plurality of regression test buckets that should be executed against each system of the plurality of exploiting systems that exploits any rule of the plurality of rules. Preferably, the first program instructions further comprise instructions to define the regression test buckets for each rule of a plurality of rules and to define any local rules that are linked to any of the regression test buckets. The computer program product further comprises second program instructions to determine, for a test request for a rules change for a rule received, which of the regression test buckets should be executed against which of the plurality of exploiting systems that exploits the rule based on the relationship established and third program instructions to run the regression test buckets that are determined should be executed against a plurality of test exploiting systems corresponding to the plurality of exploiting systems determined to exploit the rule. Preferably, the second program instructions further comprise instructions to receive from a rules change management engine the test request for the rules change for the rule. In a preferred embodiment, the third program instructions further comprise instructions to report test results of the regression test buckets that are run to the rules change management engine and to create a log of the test results that are reported. Further, preferably, the third program instructions further comprise instructions to store the log of the test results that are created in a log file. Further, the computer program product further comprises fourth program instructions to assign a unique rule identifier to each rule of the plurality of rules and to assign a unique system identifier to each system of the plurality of exploiting systems that exploits the any of the plurality of rules and to assign a unique test identifier to each of the regression test buckets. Preferably, each of the first, second, third and fourth program instructions are stored on the computer readable medium.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
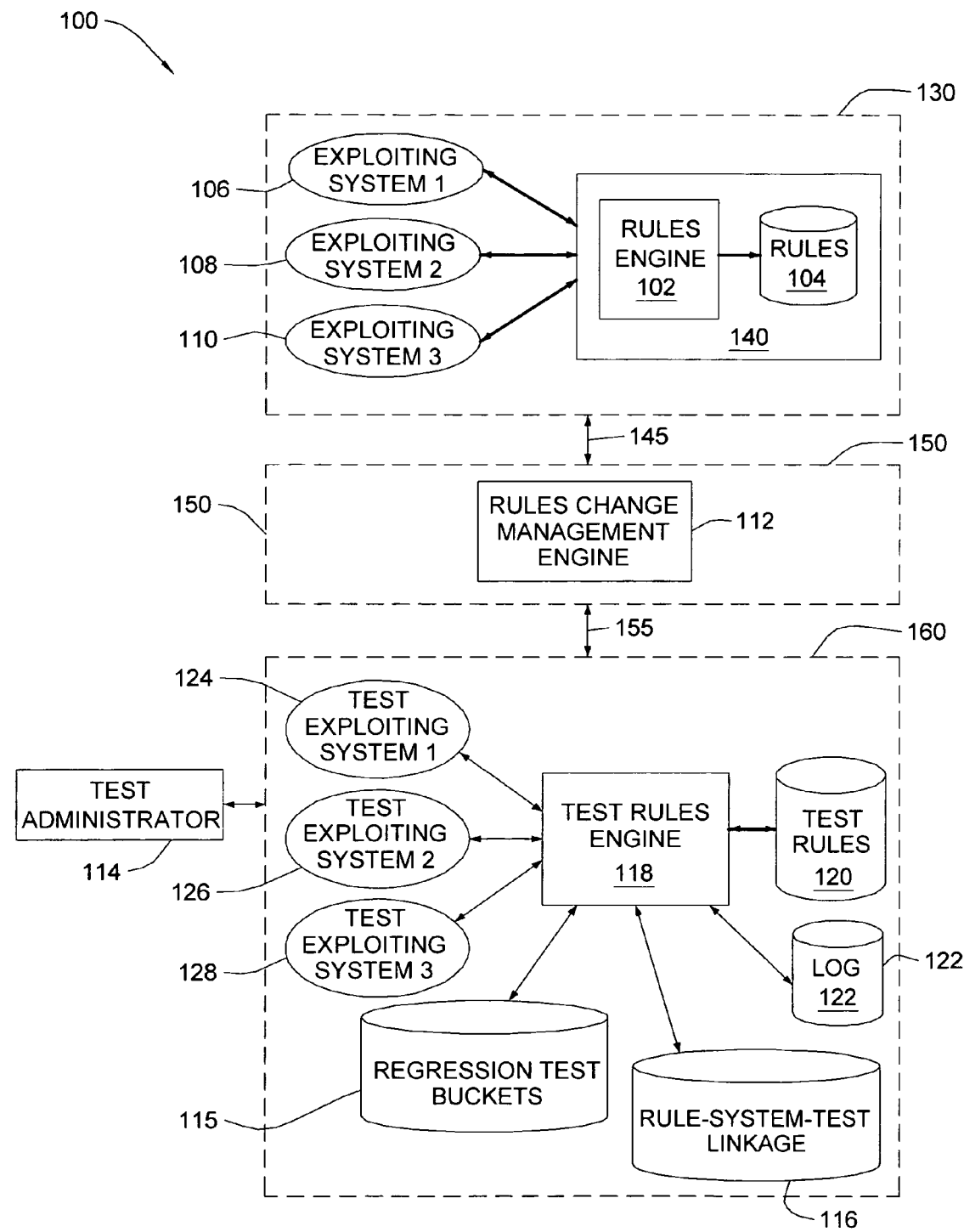
FIG. 1 is a block diagram illustrating a system for testing changes to externalized rules, in accordance with an embodiment of the invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides a system for testing changes to externalized rules. The system comprises a rules engine configured to manage a plurality of rules, each rule of the plurality of rules being exploited by one or more test exploiting systems of a plurality of test exploiting systems, and a rules change management engine coupled to the rules engine, the rules change management engine being configured to update any of the plurality of rules in the rules engine. The system further comprises a plurality of test exploiting systems, each of the test exploiting systems corresponding to one of the plurality of exploiting systems. Further, the system comprises a regression test buckets file configured to store regression test buckets that are defined for each rule of the plurality of rules and a rule-system-test linkage file configured to provide a linkage between the regression test buckets that are defined for each rule and the one or more exploiting systems that exploit each rule. Preferably, each of the regression test buckets stored in the regression test buckets file is defined to correspond to one or more of the plurality of rules. Further, in a preferred embodiment, the rule-system-test linkage file is further configured to link a unique rule identifier to each rule of the plurality of rules, and to link a unique system identifier to each system of the plurality of test exploiting systems that exploits the plurality of rules, and to link a unique test identifier to each of the regression test buckets that are defined. Furthermore, the system comprises a test rules engine configured to receive a test request for a rules change for a rule in the rules engine from the rules change management engine and configured to select which of the regression test buckets from the regression test buckets file should be executed in response to the test request for the rules change and to select one or more of the plurality of test exploiting systems based on the linkage obtained from the rule-system-test linkage file and to initiate the running of the regression test buckets selected on the one or more of the plurality of test exploiting systems selected in order to test the rules change received for the rule in the test request. In a preferred embodiment, the system further comprises a test rules file configured to store a copy of the plurality of rules and a log file configured to store test results of the one or more of the regression test buckets run. Preferably, the test rules engine is further configured to report test results of the one or more of the regression test buckets that are run to the rules change management engine. Preferably, the test rules engine is further configured to create a log of the test results of the one or more of the regression test buckets run and to store the log in the log file.

As used herein, the term "rule" or "business rule(s)" refers to any action in one or more business processes or systems to implement a policy or procedure of or related to the business process. Further, the term "externalized rule(s)" refers to a rule or business rule whose executable form may be separated from the system that uses the conclusion or output of the rule. Moreover, the term "exploiting system(s)" refers to any system that uses the conclusion or output of a given rule. The expression of a rule comprises a relationship between an input and an output. Generally, a rule can be expressed in a natural language, such as English, in the form of a conditional "If/then" statement, where the "if" part forms the condition and the "then" portion of the statement would define one or more actions to be performed, if the specified condition is satisfied. For example, one business rule could be a condition, such as "If total amount in the shopping cart is more than $100, then apply a 5% discount." The input (the total amount of $100) is related to the output (a 5% discount), such that if the total amount is greater than $100, a 5% discount is applied to the total amount and if the total amount is less than or equal to $100, no discount is applied. Thus, an externalized or business rule defines the conditions under which different paths are to be taken in a business process. Further, the term "rules engine" refers to a software tool used in production for deriving, based on data that matches the premises of the rules, the conclusions to be drawn from the rules. The rules engine is also capable of acting as an intelligent agent on behalf of an administrator (i.e., a party that uses the rules engine's interface, such as, a test administrator computer (shown in FIG. 1) to store rules and perform other administrative duties with respect to the rules engine. Additionally, the term "test rules management system" or "test management system" refers to a system for testing a rules change on a test exploiting system versus an actual exploiting system, as explained herein below. Further, the term "test rules engine" refers to an instance of the rules engine, which is separate or isolated from the rules engine, thus, allowing the test rules management system to execute a modified version of an original rule. Furthermore, the term "test rules engine" refers to a modified copy of the one or more rules to be tested using the test rules management system. Further yet, the term "exploiting system" is defined herein as a system, for instance, a server that invokes the rules engine and uses the rules' output that is returned by the rules engine to control its own processing. The term "test exploiting systems" refers to copies of exploiting systems, which are separate or isolated from the exploiting systems, and which enable the test management system to execute one or more regression test buckets, which in turn cause invocation of a test rule on the test management system's test rules engine, versus running tests on the actual exploiting systems and the actual rules engine. Furthermore, the term "rules change" or "rule change" refers to any change, such as, adding a rule to a set of rules, removing a rule from a set of rules, changing a monetary limit or other boundary conditions. Additionally, the term "regression test(s)" refers to the retesting of something that was successfully tested once, in order to catch any unanticipated errors that slipped in when a rule change was made in the system. Further, the term "regression test bucket(s)" refers to a set of regression tests, where each set of regression tests may be run to test processing of an exploiting system that is related to exploitation of a given rule. The term "regression test buckets file" refers to a system, for instance, a database or file that stores the one or more regression test buckets used to test rules and/or changes to rules. Further, the term "rule-system-test linkage file" refers to a system, for instance, a database or file or another mechanism that stores the different relationships between rules, test exploiting systems and regression test buckets as defined, preferably, by a test administrator or user. Also, the term "test request" refers to a request to test a change or modification to an existing rule that is in use by various exploiting systems.

Reference is now made to FIG. 1, which illustrates one embodiment of a system for testing changes to externalized rules, in accordance with an embodiment of the invention. As shown in FIG. 1, the system 100 comprises computing systems 130, 140, 150 and 160, wherein the computing systems, such as servers, are connected to one another, preferably, via a network connection, as shown by the double-sided arrows 145 and 155. Although, computing systems 130, 140, 150 and 160 are shown as separate systems, they may be part of a same computing system. The computing system 140 comprises a rules engine 102, which is configured to manage a plurality of rules 104 that are stored on the computing system 140, preferably, in a database or file or other storage mechanism. Further, FIG. 1 shows each of the exploiting systems 106, 108 and 110 to be directly connected to and located in the same general location, such as, the same building, etc. as the computing system 140 and together comprise the computing system 130. Alternatively, one or more of the exploiting systems 106, 108 and 110 could be connected to the computing system 140 via a network connection (not shown in FIG. 1) and not included within computing system 130. Further, system 100 shows a computing system 150 that comprises a rules change management engine 112. Preferably, the rules change management engine 112 comprises a software tool that is configured to manage any requests for a rules change for any of the rules 104 on the computing system 140. Preferably, the rules 104 are stored in a database or file in the computing system 140. As such, the rules change management engine 112 is configured to retrieve, update and/or activate rules 104. Again, although the rules change management engine 112 is shown as being located on a separate computing system 150, alternatively, the rules change management engine 112 can be located on the same computing system as the rules engine 102. Preferably, any changes to the rules 104 are handled through the rules change management engine 112. Additionally, the system 100 includes a computing system 160, referred to as a test management system 160, which comprises a test rules engine 118 for executing a changed version of one or more rules 104, as part of the test of the change. Preferably, the computing system 160 comprises test rules 120, which are stored, for instance, in a database or file on computing system 160. The test rules 120 comprise a modified copy of the one or more rules to be tested using the test management system 140, such that the exploiting systems 106, 108, 110 in the computing system 130 are protected from possible negative side-effects of untested changes to the original rules 104. Further, the test management system 160 comprises a plurality of test exploiting systems 124, 126 and 128 that are duplicate copies that are copies faithful enough for test purposes and correspond to the plurality of exploiting systems 106, 108 and 110, respectively, in the computing system 130. Again, as a safety precaution, the test rules engine 118 initiates the execution of a modified copy of the original rule against the one or more test exploiting systems 124, 126 and 128, as described herein below. Further, the test management system 160 comprises a plurality of regression test buckets 115 that are stored preferably in a database or file within the computing system 160. More preferably, the plurality of regression test buckets 115 are defined in relation to the one or more rules 104 and the corresponding exploiting systems 106, 108, 110. Further, the computing system 160 comprises a rule-system-test linkage file 116 that is configured to provide a linkage or relationship between the rules 104, the exploiting systems 106, 108 and 110 and the regression test buckets 115. Preferably, the rule-system-test linkage file 116 is configured to link a unique rule identifier to each rule of the plurality of rules 104 and to link a unique system identifier to each exploiting system that exploits one or more of the rules. Further, the rule-system-test linkage file 116 is configured to link a unique test identifier for each of the regression test buckets 115, such that the test rules engine 118 can use the linkage in the rule-system-test linkage file 116 to initiate the execution of one or more regression test buckets 115 against one or more test exploiting systems 124, 126, and 128 to force said exploiting systems to cause execution of a modified copy (test rules 120) of the original rule (rules 104). Further, the computing system 160 comprises a log file 122 that is configured to store test results of any regression test buckets 115 that are run against any test exploiting system(s), 124, 126 and 128, by the test management system 160. Preferably, the test management system 160 is configured to receive a test request for a rules change for a rule from the rules change management system 150 and is configured to select which of the regression test buckets 115 should be executed in response to the test request for the rules change and based on the linkage or relationship information obtained from the rule-system-test linkage file 116 and, thus, is able to run the selected regression test buckets in order to test the test request for the rules change received for a rule. Further, the test management system 160 is configured to report back to the rules change management system 150 the test results of any regression test buckets 115 that are run, as explained further with respect to FIG. 4.

In another embodiment, the present invention provides a method of testing changes to externalized rules. The method comprises providing regression test buckets for testing a version of a rule against each of a plurality of exploiting systems that exploits the rule by using a rules change management engine and receiving a test request for a rules change for a rule. Further, the method comprises determining for the test request for the rules change received, which of the regression test buckets should be executed against which of the plurality of exploiting systems that exploits the rule and running, using a test rules management system, the regression test buckets that are determined should be executed. Preferably, the providing step comprises the steps of defining regression test buckets for each rule of a plurality of rules, linking a unique test identifier to each of the regression test buckets that are defined, and defining any local rules that are linked to any of the regression test buckets for controlling the running of the regression test buckets. Additionally, in a preferred embodiment, the receiving step further comprises the step of receiving into a test rules management system the test request for the rules change for the rule from the rules change management engine. Preferably, the determining step further comprises the step of establishing one or more relationships between each regression test bucket of a plurality of regression test buckets and each system of a plurality of exploiting systems that exploits any rule of a plurality of rules, and between each rule of the plurality of rules and one or more regression test buckets of the plurality of regression test buckets that should be executed against each system of the plurality of exploiting systems that exploits any rule of the plurality of rules. Further, in a preferred embodiment, the running step further comprises the steps of consulting the one or more relationships to determine a relevant set of the regression test buckets that should be executed, and running, using the test rules management system, the relevant set of the regression test buckets that are determined should be executed against a plurality of test exploiting systems corresponding to the plurality of exploiting systems. The method further comprises reporting test results of the regression test buckets that are run to the rules change management engine, such that the rules change management engine is able to determine whether or not to implement the rules change for the rule based on the test results that are reported. Preferably, the method further comprises the step of creating a log of the test results that are reported. In a preferred embodiment, the method comprises linking a unique rule identifier to each rule of a plurality of rules, and linking a unique system identifier to each system of the plurality of exploiting systems that exploits each rule of the plurality of rules.

Preferably, the creating step further comprises the step of storing the log of the test results that are created in a log file.

Figure 2:
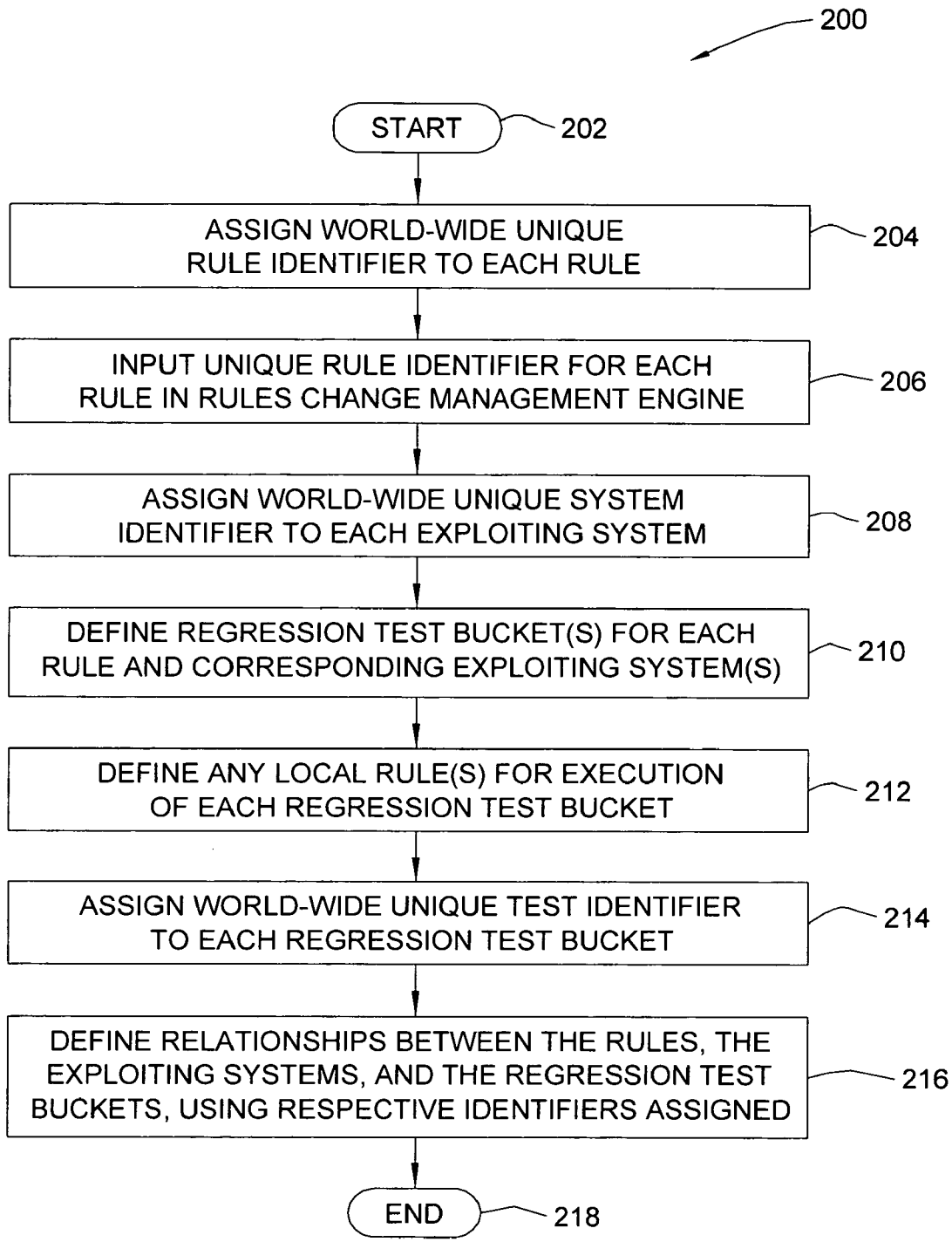
FIG. 2 is an illustration of a flowchart depicting a method for configuring a system for testing changes to externalized rules, in accordance with an embodiment of the invention.
Figure 3:
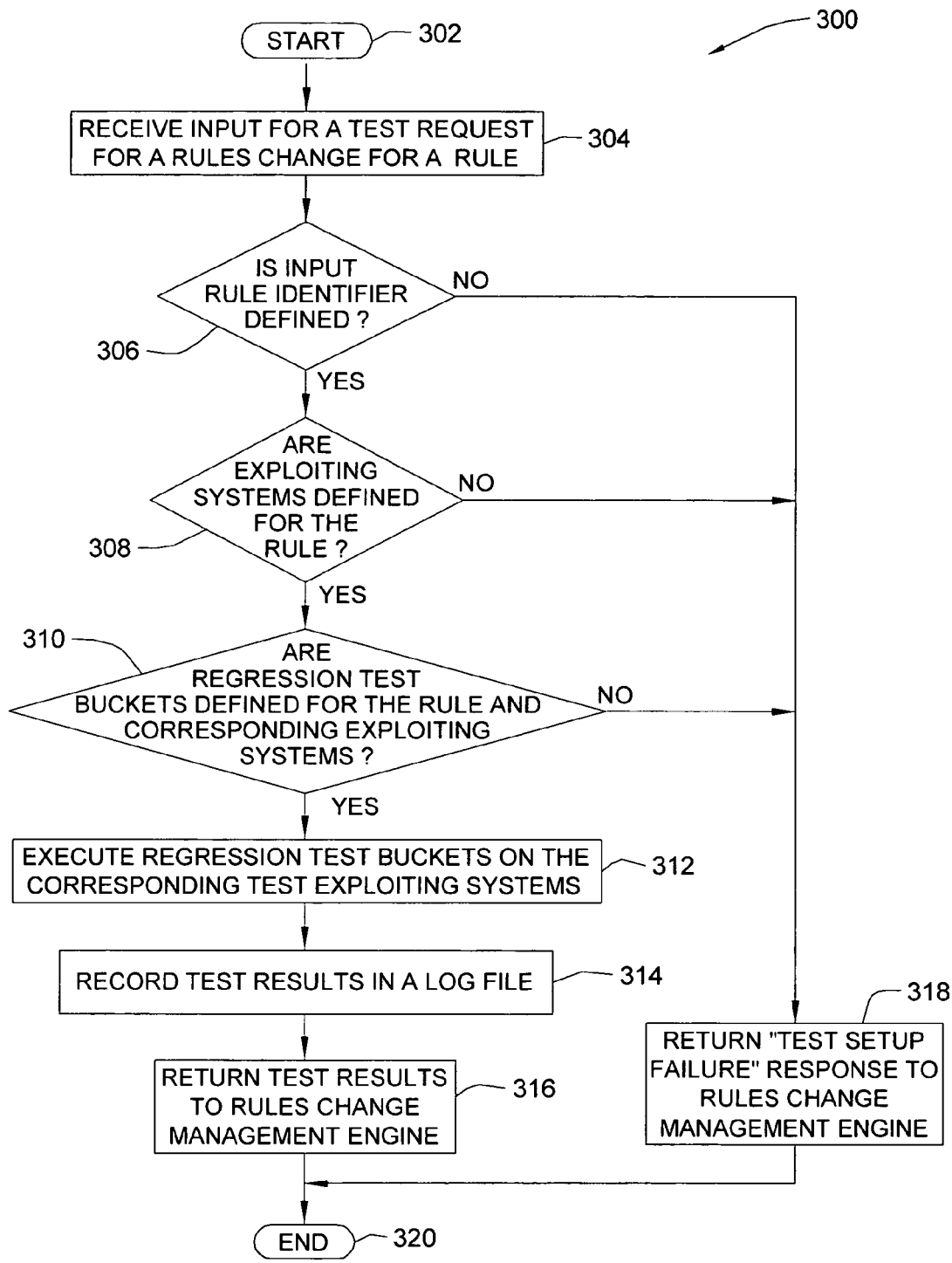
FIG. 3 is an illustration of a flowchart depicting a method for testing changes to externalized rules, in accordance with an embodiment of the invention.

Reference is now made to FIGS. 2 and 3, which together illustrate one embodiment of a method of testing externalized or business rules, in accordance with an embodiment of the invention. In particular, reference numeral 200 outlines a method of configuring the various components shown in the system 100 of FIG. 1, such that the system 100 can perform a method of testing externalized or business rules, in accordance with an embodiment of the invention. As shown in FIG. 2, the configuration process begins at step 202 with each rule of the plurality of rules being assigned, in step 204, a world-wide unique rule identifier. The world-wide unique rule identifier assigned for each of the rules is inputted in step 206 into the rules change management engine. Further, a world-wide unique system identifier is assigned in step 208 to each exploiting system that exploits any of the rules 104. In step 210, regression test buckets are defined for each rule in the rules database and for any exploiting system(s) that exploits each of the rules, that is, any given regression test bucket is defined for a pair of a rule and one or more system(s). For instance, one bucket could be defined for a pair of rule and system(s) or, alternatively, multiple buckets could be defined for a given pair of rule and system(s). Further, in step 212, any local rule or rules that may be necessary for executing each regression test of the regression test buckets are defined. Additionally, in step 214, a world-wide unique test identifier is assigned to each of the regression test buckets that have been defined in step 212. Further, in step 216, relationships between the rules, the exploiting systems and the regression test buckets are defined, using the respective unique rule, system and test identifiers that have been assigned in steps 204, 208 and 214, respectively, and the process ends at step 218.

Turning to FIG. 3, reference numeral 300 outlines a method used by a system, such as the one shown in FIG. 1, for testing changes to externalized or business rules by using the configuration method outlined in FIG. 2 for testing changes. The method starts at step 302 with the test rules engine receiving input for a test request for a rules change for a rule in step 304. Further, in step 306, the test rules engine checks to see whether the rule identifier is defined in the input, that is, whether a unique identifier has been assigned for the rule for which a rules change is being requested. If the unique rule identifier is not defined in the input in step 306, then the test rules engine returns a "test setup failure" response to the rules change management engine in step 318 and the process ends at step 320. However, if the unique rule identifier is defined in step 306, the test rules engine checks to see whether the exploiting systems that exploit the rule for which a test request has been received have been defined in step 308, that is, whether any exploiting system that exploits the rule to be changed is defined and whether the corresponding unique system identifier(s) for the exploiting system(s) have been provided. If the exploiting system(s) have not been defined or if the unique system identifiers for each of exploiting systems have not been provided, then the test rules engine returns a "test setup failure" response to the rules change management engine in step 318 and the process ends at step 320. However, if the exploiting system(s) are defined and the corresponding unique system identifiers are provided in step 306, the test rules engine checks to see in step 310 whether regression test buckets have been defined for the rule for which a test request has been received and whether corresponding test identifiers have been provided. If the regression test buckets are not defined or if the unique test identifiers are not provided in the input in step 310, then the test rules engine returns a "test setup failure" response to the rules change management engine in step 318 and the process ends at step 320. However, if the regression test buckets are defined and the corresponding unique test identifiers have been provided in step 310, the test management system executes in step 312 the regression test buckets defined for the rule for which a test request has been received on test exploiting systems that correspond to the exploiting systems that have been defined for that rule. The test rules engine records or logs the test results for the regression test buckets that have been executed in a log file in step 314. Further, the test rules engine returns or reports the test results in step 316 to the rules change management engine, ending the process at step 320.

In yet another embodiment, the present invention provides a method for deploying computing infrastructure, comprising integrating computer-readable code into a computing system, wherein the code in combination with the computing system is capable of performing a process of testing changes to externalized rules. The process comprises providing regression test buckets for testing a version of a rule against each of a plurality of exploiting systems that exploits the rule by using a rules change management engine and receiving a test request for a rules change for a rule. Further, the process comprises determining for the test request for the rules change received, which of the regression test buckets should be executed against which of a plurality of test exploiting systems that correspond to the plurality of exploiting systems that exploits the rule, running the regression test buckets that are determined should be executed, creating a log of the test results that are reported and reporting test results of the regression test buckets that are run to the rules change management engine, such that the rules change management engine is able to determine whether or not to implement the rules change for the rule based on the test results that are reported. In a preferred embodiment, the process further comprises linking a unique rule identifier to each rule of the plurality of rules and linking a unique system identifier to each system of the plurality of exploiting systems that exploits each rule of the plurality of rules. Preferably, the providing step further comprises the steps of defining regression test buckets for each rule of a plurality of rules, linking a unique test identifier to each of the regression test buckets that are defined, establishing one or more relationships between each regression test bucket of a plurality of regression test buckets and each system of a plurality of exploiting systems that exploits any rule of a plurality of rules, and between each rule of the plurality of rules and one or more regression test buckets of the plurality of regression test buckets that should be executed against each system of the plurality of exploiting systems that exploits any rule of the plurality of rules, and defining any local rules that are linked to any of the regression test buckets for controlling the running of the regression test buckets. In a preferred embodiment, the receiving step further comprises the step of receiving into a test rules management system the test request for the rules change for the rule from the rules change management engine. Preferably, the running step further comprises the step of running, using the test rules management system, the regression test buckets that are determined should be executed against a plurality of test exploiting systems which correspond to the plurality of exploiting systems that exploits the rule, and preferably, the creating step further comprises the step of storing the log of the test results that are created in a log file.

Figure 4:
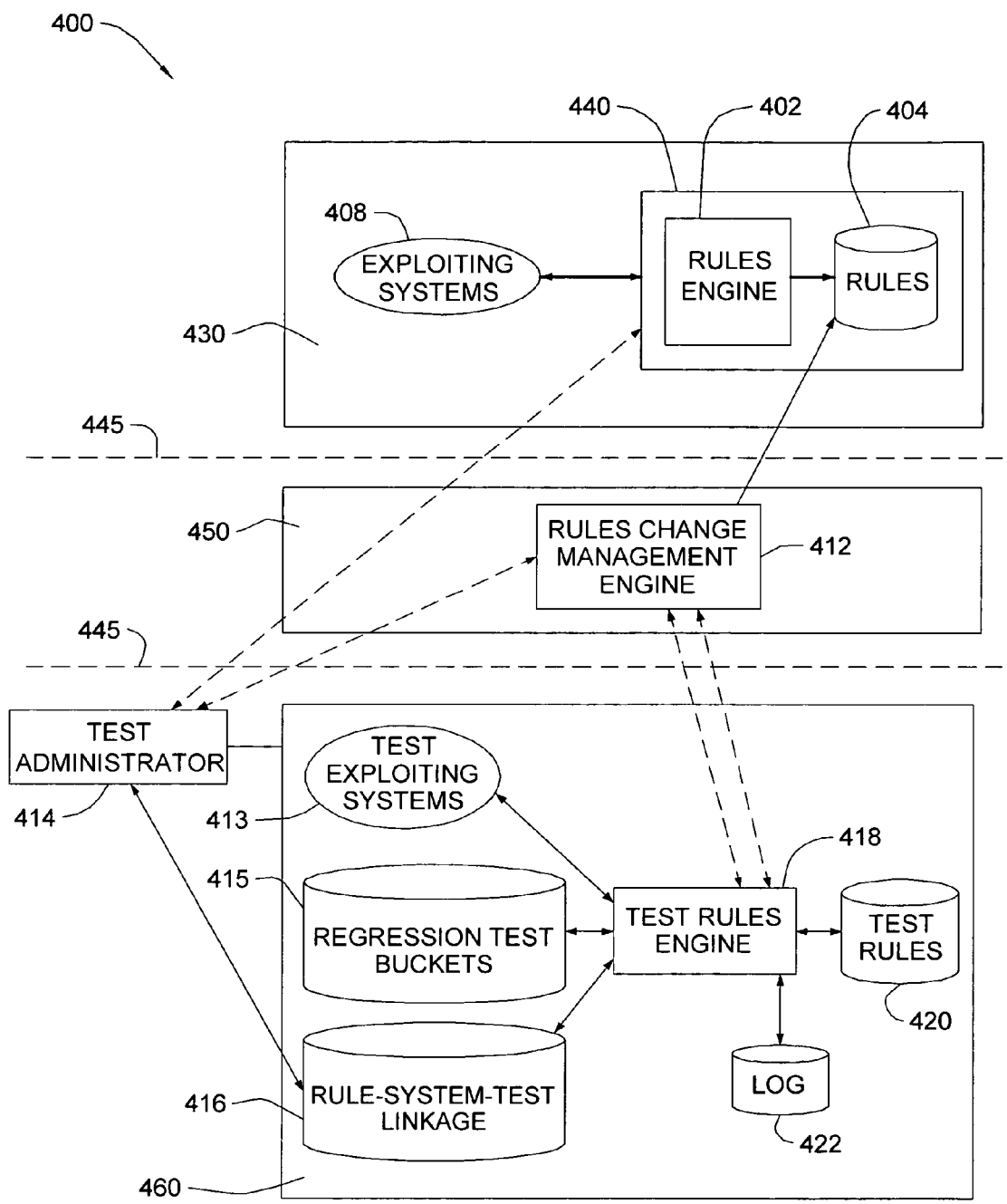
FIG. 4 is a block diagram illustrating a system for testing changes to externalized or business rules, in accordance with an embodiment of the invention.

Reference is now made to FIG. 4, which illustrates a system 400 for testing changes to externalized or business rules using the methods outlined in FIGS. 2 and 3, wherein the system 400 is similar in structure to the system 100 described in FIG. 1. Accordingly, the discussion with respect to FIG. 1 is applicable to FIG. 4. Further, as mentioned herein above, before any changes to a rule can be tested, the process outlined in FIG. 2 is performed, such that a unique rule identifier is assigned for each of the rules 404 in computing system 440 and inputted into the rules change management engine 412. Similarly, a unique system identifier is assigned for each of the exploiting systems 408 and a unique test identifier is assigned for each of the regression test buckets 415. Furthermore, the linkage or relationship between each of the rules 404 and the regression test buckets 415 is established using the unique identifiers assigned to each of the regression test buckets 415 and each of the rules 404 and, preferably, the established relationships are stored in the rule-system-test linkage file 416. Similarly, the linkage or relationship between each of the exploiting systems 408 and each of the regression test buckets 415 used to test the exploiting systems 408 is established using the unique identifiers assigned to each the exploiting systems 408 and each of the regression test buckets 415 and, preferably, the established relationships are stored in the rule-system-test linkage file 416. Further, preferably, a copy (complete enough for test purposes) of each of the exploiting systems 408 is created and stored as test exploiting systems 413 in the computing system or test management system 460, such that the test rules engine 418 can run in a safe environment any regression test buckets 415 on one or more relevant test exploiting systems 413 instead of running any regression test buckets 415 on one or more relevant exploiting systems 408. Similarly, test management system 460 comprises test rules 420, which comprises one or more modified versions of the original rules 404, in order to allow test of those modified versions in isolation from the original rules 404 and, thus, enable protecting the original rules 404 from any change until the modified versions have been tested. Accordingly, the test rules engine 418 has all the relevant linkage information based on the respective identifiers assigned for the rules, the exploiting systems and regression test buckets in order to test any changes to a given rule. Thus, when a user or test administrator 414 wants to change a rule of the plurality of the rules 404 stored in computing system 440, the user or test administrator enters a test request for changing the rule into the rules change management engine 412. The rules change management engine 412 forwards or sends the test request for a rules change to the test rules management system 460. When the test rules engine receives the test request from the rules change management engine 412, the test rules management system 460 checks to see whether the unique rule identifier is provided in the input with the test request, whether exploiting systems are defined for the rule, whether regression test buckets are defined for the rule and the corresponding exploiting systems to be tested. If all the identifiers are provided, the test rules management system 460, uses the linkage information based on the respective unique identifiers that are provided in the rule-system-test linkage file 416 and runs, within the test management system 460, the appropriate regression test buckets 415, preferably, against test exploiting systems 413 that correspond to the exploiting systems 408 in computing system 430, such that if the test results are negative, the exploiting systems 408 are not effected by running any regression test buckets 415 on the systems 408. Further, after the regression test buckets 415 have run to completion, the test rules engine 418 creates a log of the test results, which is preferably stored in a log file 422. The test rules engine 418 further reports the test results of the regression test buckets 415 executed to the rules change management engine 412, such that the rules change management engine is able to determine based on the test results whether or not the requested change to the rule should or should not be implemented.

In a further embodiment, the present invention provides a computer program product for testing changes to externalized rules. The computer program product comprises a computer readable medium and first program instructions to establish one or more relationships between each regression test bucket of a plurality of regression test buckets and each system of a plurality of exploiting systems that exploits any rule of a plurality of rules, and between each rule of the plurality of rules and one or more regression test buckets of the plurality of regression test buckets that should be executed against each system of the plurality of exploiting systems that exploits any rule of the plurality of rules. Preferably, the first program instructions further comprise instructions to define the regression test buckets for each rule of a plurality of rules and to define any local rules that are linked to any of the regression test buckets. The computer program product further comprises second program instructions to determine, for a test request for a rules change for a rule received, which of the regression test buckets should be executed against which of the plurality of exploiting systems that exploits the rule based on the relationship established and third program instructions to run the regression test buckets that are determined should be executed against a plurality of test exploiting systems corresponding to the plurality of exploiting systems determined to exploit the rule. Preferably, the second program instructions further comprise instructions to receive from a rules change management engine the test request for the rules change for the rule. In a preferred embodiment, the third program instructions further comprise instructions to report test results of the regression test buckets that are run to the rules change management engine and to create a log of the test results that are reported. Further, preferably, the third program instructions further comprise instructions to store the log of the test results that are created in a log file. Further, the computer program product further comprises fourth program instructions to assign a unique rule identifier to each rule of the plurality of rules and to assign a unique system identifier to each system of the plurality of exploiting systems that exploits the any of the plurality of rules and to assign a unique test identifier to each of the regression test buckets. Preferably, each of the first, second, third and fourth program instructions are stored on the computer readable medium.

Preferably, the computer program product is in a form accessible from the computer-usable or computer-readable medium, which provides program codes or instructions for use by or in connection with a computer or any instruction execution system. For the purposes of this description, a computer-usable or computer readable medium can be any apparatus that can contain, store, communicate, propagate, or transport the codes or instructions for use by or in connection with the instruction execution system, apparatus, or device. Preferably, the medium can comprise an electronic, magnetic, optical, electromagnetic, infrared, or semiconductor system (or apparatus or device) or a propagation medium. More preferably, the computer-readable medium can comprise a semiconductor or solid state memory, magnetic tape, a removable computer diskette, a random access memory (RAM), a read-only memory (ROM), a rigid magnetic disk and an optical disk. Further, examples of optical disks include compact disc—read only memory (CD-ROM), compact disc—read/write (CD-R/W) and digital versatile/ video disc (DVD). Further, preferably, network medium can comprise of transmission devices on a network, such as, cables, routers, switches and/or network adapter cards.

Figure 5:
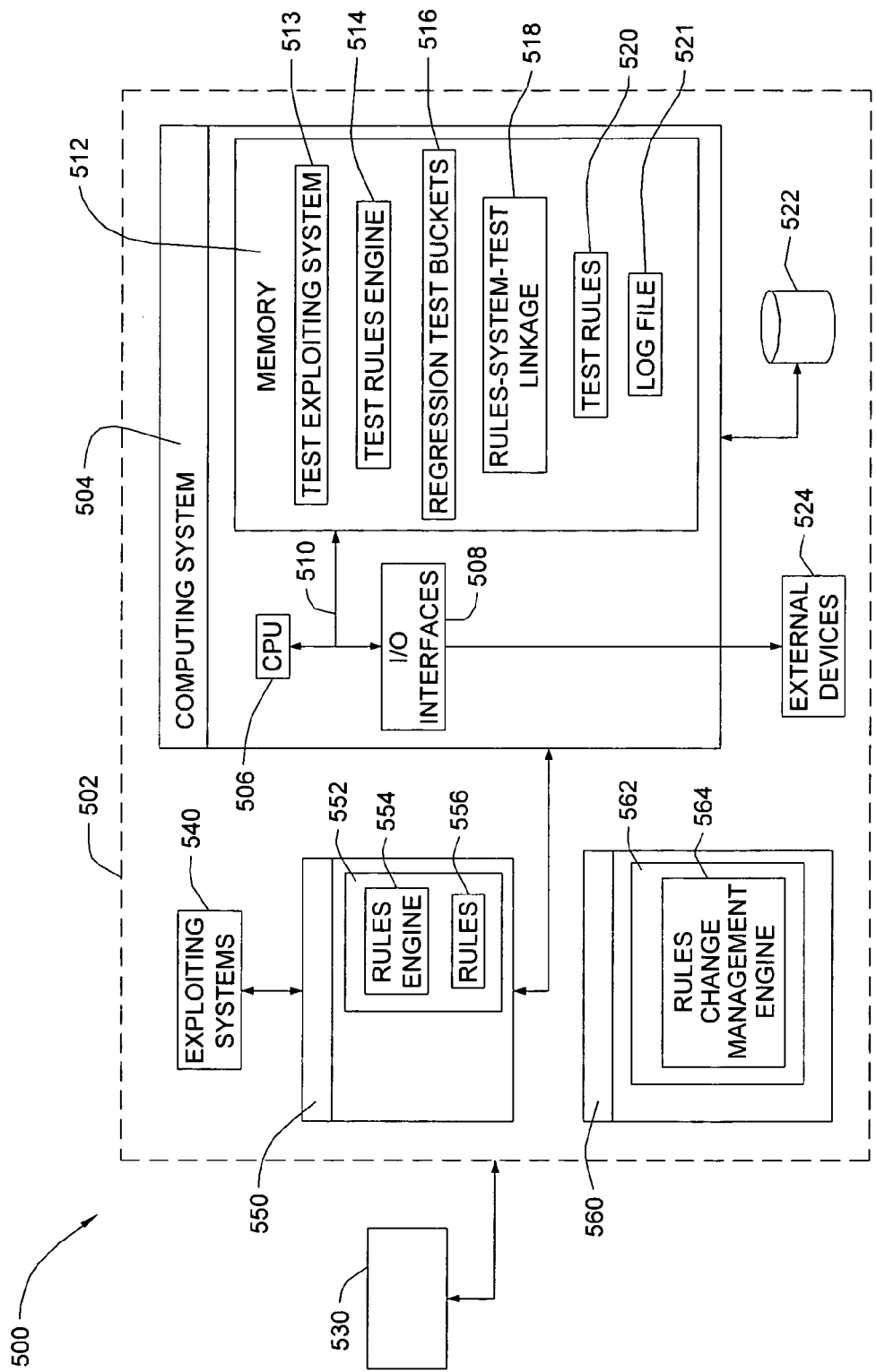
FIG. 5 is a schematic block system diagram illustrating a computer program product for testing changes to externalized or business rules, in accordance with an embodiment of the invention.

Referring to FIG. 5, reference numeral 500 is a schematic block system diagram illustrating a computer program product for testing changes to externalized or business rules. As depicted, system 500 includes a computer infrastructure 502, which is intended to represent any type of computer architecture that is maintained in a secure environment (i.e., for which access control is enforced). Computer infrastructure 502 is only illustrative of various types of computer infrastructures for implementing the invention. As shown, infrastructure 502 includes computing system 504 that typically represents a server or the like and further, includes computing systems 540, 550 and 560. It should be understood, however, that although not shown, other hardware and software components (e.g., additional computer systems, routers, firewalls, etc.) could be included in infrastructure 502. In general, a user or a test administrator 530 interfaces with infrastructure 502 for testing changes to externalized or business rules. Further, one or more other users or test administrators (not shown in FIG. 5) can interface with infrastructure 502 to test changes to externalized or business rules. Alternatively, a service provider 530 that provides a service to clients (not shown in FIG. 5) can interface with infrastructure 502 to test changes to externalized or business rules, preferably, with infrastructure 502 providing a secure environment. More preferably, the service provider 530 provides a service for testing changes to externalized or business rules, more preferably, a service that is provided on a fee or subscription basis to clients. In general, the respective parties could access infrastructure 502 directly, or over a network via interfaces (e.g., web browsers) loaded on computerized devices (e.g., personal computers, laptops, handheld devices, etc.). In the case of the latter, the network can be any type of network such as the Internet, a local area network (LAN), a wide area network (WAN), a virtual private network (VPN), etc. In any event, communication with infrastructure 502 could occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol.

Computing system 504 is shown to include a processing unit (CPU) 506, a memory 512, a bus 510, and input/output (I/O) interfaces 508. Further, computing system 504 is shown in communication with external I/O devices/resources 524 and a storage system 522. In general, processing unit 506 executes computer program codes or scripts, such as the code for the test exploiting systems 513 (which correspond to the exploiting systems 540), the test rules engine code 514, the regression test buckets 516 and the rule-system-test linkage code 518, which are stored preferably in memory 512 and alternatively can be stored in an external storage system 522. While executing a computer program code, processing unit 506 can read and/or write data, to/from memory 512, the storage system 522, and/or I/O interfaces 508. For instance, processing unit 506 can read the test rules 520 and can write a log to the log file 521 after executing the regression test buckets 516. Bus 510 provides a communication link between each of the components in computing system 504. External devices 524 can comprise any devices (e.g., keyboard, pointing device, display, etc.) that enable a user to interact with computing system 504 and/or any devices (e.g., network card, modem, etc.) that enable computing system 504 to communicate with one or more other computing devices. Moreover, computing system 504 is only representative of various possible computer systems that can include numerous combinations of hardware. To this extent, in other embodiments, computing system 504 can comprise any specific purpose computing article of manufacture comprising hardware and/or computer program code for performing specific functions, any computing article of manufacture that comprises a combination of specific purpose and general purpose hardware/ software, or the like. In each case, the program code and hardware can be created using standard programming and engineering techniques, respectively. For instance, the processing unit 506 may comprise a single processing unit, or be distributed across one or more processing units in one or more locations, e.g., on a client and server. Similarly, memory 512 on server 504 and/or the storage system 522 can comprise any combination of various types of data storage and/or transmission media that reside at one or more physical locations. Further, I/O interfaces 508 can comprise any system for exchanging information with one or more external devices 524. Still further, it is understood that one or more additional components (e.g., system software, math co-processing unit, etc.—not shown in FIG. 5) can be included in computing system 504. Furthermore, if the computing system 504 comprises a handheld device or the like, it is understood that one or more external devices, for instance, a display could be contained within the computing systems, and not externally as shown for computing system 504. The storage system 522 can be any type of database or memory system capable of providing storage for information under the present invention. To this extent, the storage system 522 could include one or more storage devices, such as a magnetic disk drive or an optical disk drive. In another embodiment, the storage system 522 includes data distributed across, for example, a local area network (LAN), wide area network (WAN) or a storage area network (SAN) (not shown). Although not shown, additional components, such as cache memory, communication systems, system software, etc., may be incorporated into computing system 504.

Further, as shown in FIG. 5, computing system 504 is capable of communicating with computing systems 550 and 560. Preferably, the computing systems 550 and 560 communicate over a network to perform the various process steps of the invention. Although not shown in FIG. 5, each of the computing systems includes a processing unit (CPU), a memory, a bus, and input/output (I/O) interfaces. Further, the computing systems 550 and 560 can be in communication with external I/O devices/resources and storage systems. Similar to computing system 504, each of the computing systems 540, 550 and 560 can include other combinations of hardware and can comprise any specific purpose computing article of manufacture comprising hardware and/or computer program code for performing specific functions, any computing article of manufacture that comprises a combination of specific purpose and general purpose hardware/software, or the like. In one embodiment, computing system 550 includes code or script for the rules engine 554, which is preferably stored in a memory 552 of the computing system 550. Furthermore, computing system 540 interface with computing system 550 and includes the different exploiting systems, which exploit one or more rules 556 stored in computing system 550, for instance, the exploiting systems 1, 2 and 3 of FIG. 1. Further, the computing system 550 includes the rules 556, which are preferably stored either in the memory 552 (as shown in FIG. 5) or, alternatively, in a storage system that can be accessed by the computing system 550. Further, computing system 560 includes code or script for the rules change management engine 564, which is preferably stored in a memory 562 of the computing system 560, or, alternatively, in a storage system that can be accessed by the computing system 560.

Accordingly, the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general purpose microprocessor, the computer program code segments configure the microprocessor to create specific logic circuits. One skilled in the art would appreciate that a set of programmable instructions executed by a processor of the system are required for performing the process steps of the inventive system and method described above.

Figure 6:
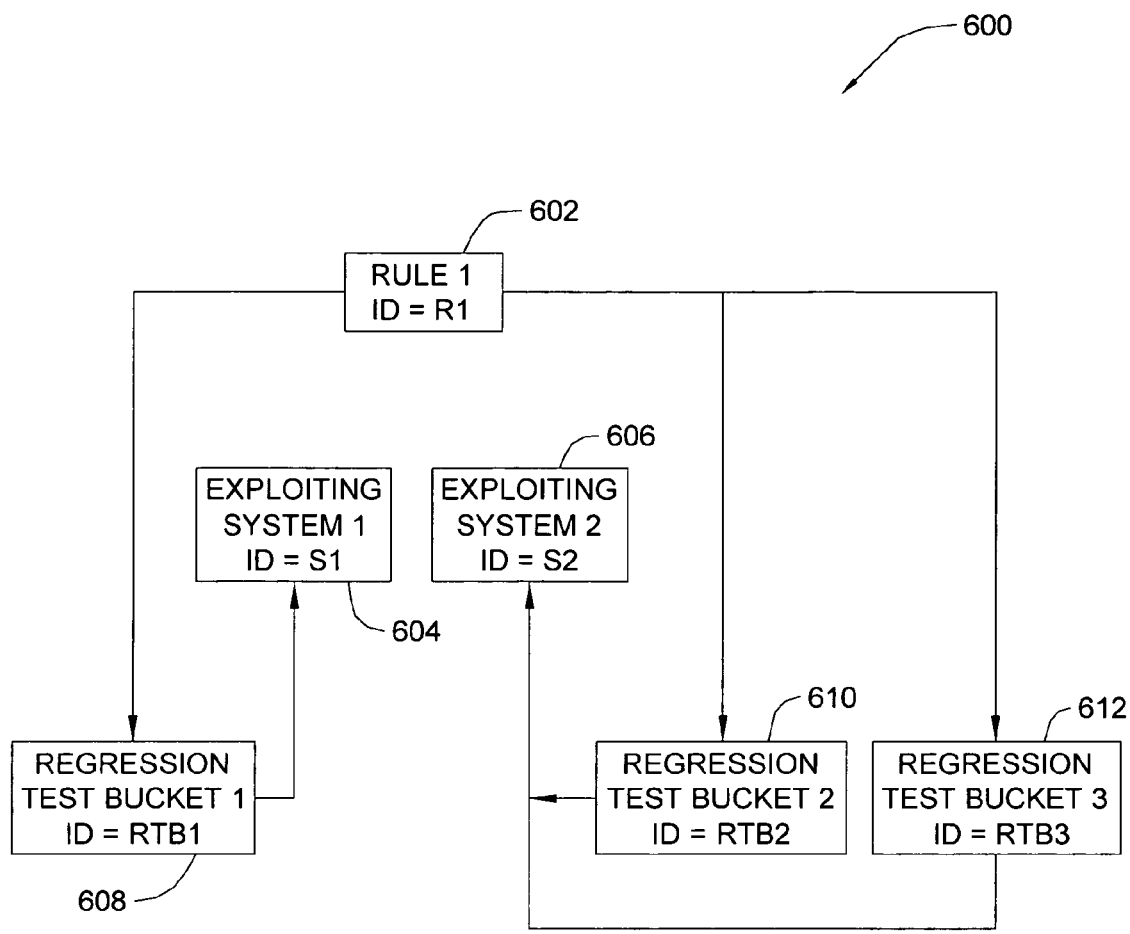
FIG. 6 is a schematic block system diagram illustrating an example of the relationships between rules, regression test buckets and test exploiting systems for testing changes to externalized or business rules, in accordance with an embodiment of the invention.

Turning to FIG. 6, FIG. 6 depicts an example 600 of testing a rules change using the unique rule identifier assigned for the rule, the unique system identifiers assigned for any exploiting systems that exploit the rule, as well as the unique test identifiers assigned to any relevant regression test buckets that will be used to test the relevant exploiting systems. In particular, as shown in FIG. 6, the rule to be changed is Rule 1 (reference numeral 602), which has been assigned a unique rule identifier of ID=R1, as shown in 602, with the unique rule identifier being inputted into the test management system and the rules change management engine. Further, it has been established that the exploiting systems that exploit rule 1 are Exploiting System 1 (reference numeral 604) and Exploiting System 2 (reference numeral 606). Further, Exploiting System 1 has been assigned a unique system identifier of ID=S1, whereas, Exploiting System 2 has been assigned a unique system identifier of ID=S2, as shown in 604 and 606, respectively and, additionally, both the unique system identifiers have been inputted into the test management system. Moreover, it has been determined that Regression Test Bucket 1 (reference numeral 608) is used to test Exploiting System 1 (reference numeral 604), which exploits Rule 1 (reference numeral 602), whereas, it has been determined that Regression Test Bucket 2 (reference numeral 610) and Regression Test Bucket 3 (reference numeral 612) are both used to test Exploiting System 2 (reference numeral 606), which also exploits Rule 1 (reference numeral 602). The Regression Test Bucket 1 (reference numeral 608) has been assigned a unique test identifier of ID=RTB1, whereas, the Regression Test Bucket 2 (reference numeral 610) has been assigned a unique test identifier of ID=RTB2 and Regression Test Bucket 3 (reference numeral 612) has been assigned a unique test identifier of ID=RTB3, with all three unique test identifiers being inputted into the test management system. Based on the assigned identifiers and based on the established linkage/relationships between the rules, the regression test buckets and the exploiting systems, when a test request for a rules change is submitted from the rules change management engine to the test management system, the unique identifier, of the rule to which a change is to be tested, is submitted along with the test request, such that the test management system is able to execute the appropriate regression test buckets against the correct exploiting systems, which exploits a given rule for which a rules change is being sought.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method of using a computer infrastructure to test changes to rules, said method comprising the steps of:

providing regression test buckets for testing a version of a rule encoded in a file on a test rules management system deployed on said computer infrastructure against each of a plurality of exploiting systems that exploits said rule by using a rules change management engine deployed on said computer infrastructure;

receiving, into said test rules management system, a test request for a rules change for a rule from said rules change management engine;

determining for said test request for said rules change received, by said test rules management system, which of said regression test buckets should be executed against which of said plurality of exploiting systems that exploits said rule;

running, using said test rules management system, said regression test buckets that are determined should be executed; and implementing, using said rules change management engine deployed on said computer infrastructure said rules change for said rule based on said regression test buckets executed in said running step on said test rules management system.

2. The method according to claim 1, further comprising the steps of:

reporting to said rules change management engine test results of said regression test buckets that are run in order to implement said rules change for said rule; and creating a log of said results that are reported; and storing said log of said test results that are created in a log file.

3. The method according to claim 1, further comprising the steps of:

assigning a unique rule identifier to said each rule of said plurality of rules; and assigning a unique system identifier to said each system of said plurality of exploiting systems that exploits said each rule of said plurality of rules.

4. The method according to claim 3, wherein said providing step further comprises the steps of:

defining regression test buckets for each rule of a plurality of rules;

assigning a unique test identifier to each of said regression test buckets that are defined; and defining any local rules that are linked to any of said regression test buckets for controlling said running of said regression test buckets.

5. The method according to claim 4, wherein said determining step further comprises the step:
 establishing one or more relationships between each regression test bucket of a plurality of regression test buckets and each system of a plurality of exploiting systems that exploits any rule of a plurality of rules, and between each rule of said plurality of rules and one or more regression test buckets of said plurality of regression test buckets that should be executed against each system of said plurality of exploiting systems that exploits said any rule of said plurality of rules.

6. The method according to claim 5, wherein said running step further comprises the steps of:
 consulting said one or more relationships to determine a relevant set of said regression test buckets that should be executed; and
 running, using said test rules management system, said relevant set of said regression test buckets that are determined should be executed against a plurality of test exploiting systems corresponding to said plurality of exploiting systems.

7. The method according to claim 6, wherein said implementing step further comprises the step of:
 recording said rule in a rules management system deployed on said computer infrastructure based on said test results reported.

8. A computer infrastructure system for automating testing of changes to rules, said system comprising:
 a rules engine comprising computer code deployed on a first computer system, said rules engine being configured to manage a plurality of rules, each rule of said plurality of rules being exploited by one or more exploiting systems of a plurality of exploiting systems stored on said first computer system;
 a rules change management engine coupled to said rules engine, said rules change management engine comprising computer code deployed on a second computer system, said rules change management engine being configured to update any of said plurality of rules in said rules engine;
 a plurality of test exploiting systems stored on a third computer system, each of said test exploiting systems corresponding to one of said plurality of exploiting systems;
 a regression test buckets file stored on said third computer system, said regression test buckets file being configured to store regression test buckets that are defined for each rule of said plurality of rules;
 a rule-system-test intake file located on said third computer system, said rule-system-test linkage file being configured to provide a linkage between said regression test buckets that are defined, said each rule of said plurality of rules and said one or more exploiting systems that exploit said each rule; and
 a test rules engine comprising computer code deployed on said third computer system, said test rules engine being configured to receive a test request from said rules change management engine for a rules change for a rule of said plurality of rules and configured to select which of said regression test buckets from said regression test buckets file should be executed in response to said test request for said rules change and to select one or more of said plurality of test exploiting systems based on said linkage obtained from said rule-system-test linkage file and to initiate running said regression test buckets selected on said one or more of said plurality of test exploiting systems selected in order to test said rules change received for said rule in said test request; wherein said rules change management engine is further configured to implement upon passing testing said rules change for said rule in said rules engine to provide a change in said first computer system.

9. The system according to claim 8, further comprising:
 a test rules files configured to store a copy of said plurality of rules; and
 a log file configured to store test results of said one or more of said regression test buckets run.

10. The system according to claim 9, wherein said test rules engine is further configured to report said test results of said one or more of said regression test buckets that are run to said rules change management engine.

11. The system according to claim 10, wherein said test rules engine is further configured to create a log of said results of said one or more of said regression test buckets run and to store said log in said log file.

12. The system according to claim 11, wherein said rule-system-test linkage file is further configured to link a unique rule identifier to said each rule of said plurality of rules, and to link a unique system identifier to said each system of said plurality of exploiting systems that exploits said plurality of rules, and to link a unique test identifier to each of said regression test buckets that are defined.

13. The system according to claim 12, wherein each of said regression test buckets that are stored in said regression test buckets file is defined to correspond to one or more of said plurality of rules.

14. A method for deploying computing infrastructure, comprising integrating computer-readable code into a computing system, wherein said code in combination with said computing system is capable of performing a process of testing changes to rules, said process comprising:
 providing regression test buckets for testing a version of a rule encoded in a file on a test rules management system deployed on a computer infrastructure against each of a plurality of exploiting systems that exploits said rule by using a rules change management engine deployed on a computer system;
 receiving, into a test rules management system, a test request for a rules change for a rule;
 determining, by said test rules management system, for said test request for said rules change received, which of said regression test buckets should be executed against which of a plurality of test exploiting systems that correspond to said plurality of exploiting systems that exploits said rule;
 running, using said test rules management system, said regression test buckets that are determined should be executed;
 reporting test results of said regression test buckets that are run to said rules change management engine; and
 implementing on said computing infrastructure, using said rules change management engine, said rules change for said rule based on said regression test buckets executed in said running step.

15. The process according to claim 14, further comprising the steps of:
 assigning a unique rule identifier to said each rule of said plurality of rules; and
 assigning a unique system identifier to said each system of said plurality of exploiting systems that exploits said each rule of said plurality of rules.

16. The process according to claim 15, wherein said providing step further comprises the steps of:

defining regression test buckets for each rule of a plurality of rules;

assigning a unique test identifier to each of said regression test buckets that are defined;

establishing one or more relationships between said each regression test bucket of a plurality of regression test buckets and each system of a plurality of exploiting systems that exploits any rule of said plurality of rules, and between each rule of said plurality of rules and one or more regression test buckets of said plurality of regression test buckets that should be executed against each system of said plurality of exploiting system that exploits said any rule of said plurality of rules; and defining any local rules that are linked to any of said regression test buckets for controlling said running of said regression test buckets.

17. The process according to claim 16, wherein said implementing step further comprises the step of:

recoding said rule based on said test results reported.

18. The process according to claim 17, wherein said reporting step further comprises the steps of:

creating a log of said results that are reported; and storing said log of said test results that are created in a log file.

19. A computer program product stored on a computer readable medium for automating testing of changes to rules deployed on a computing infrastructure, said computer program product comprising:

a computer readable medium;

first program instructions to establish one or more relationships between each regression test bucket of a plurality of regression test buckets and each system of a plurality of exploiting systems that exploits any rule of a plurality of rules, and between each rule of said plurality of rules and one or more regression test buckets of said plurality of regression test buckets that should be executed against each system of said plurality of exploiting systems that exploits said any rule of a plurality of rules;

second program instructions to determine, for a test request for a rules change for a rule received, which of said regression test buckets should be executed against which of said plurality of exploiting systems that exploits said rule based on said relationship established;

third program instructions to run said regression test buckets that are determined should be executed against a plurality of test exploiting systems corresponding to said plurality of exploiting systems determined to exploit said rule, said third program instructions including instructions to implement said rules change for said rule in said computing infrastructure based on said regression test buckets run; and wherein said first, second and third program instructions are recorded on said medium.

20. A computer program product according to claim 19, further comprising:

fourth program instructions to assign a unique rule identifier to said each rule of said plurality of rules and to assign a unique system identifier to said each system of said plurality of exploiting systems that exploits said any of said plurality of rules and to assign a unique test identifier to each of said regression test buckets, said fourth program instructions being recorded on said medium.

21. A computer program product according to claim 20, wherein said first program instructions further comprise instructions to define said regression test buckets for said each rule of a plurality of rules and to define any local rules that are linked to any of said regression test buckets.

22. A computer program product according to claim 21, wherein said second program instructions further comprise instructions to receive from a rules change management engine said test request for said rules change for said rule.

23. A computer program product according to claim 22, wherein said third program instructions further comprise instructions to report results of said regression test buckets that are run to said rules change management engine and to create a log of said results that are reported and to store said log of said test results that are created in a log file.

24. A computer program product according to claim 23, wherein said third program instructions further comprise instructions to recode said rule in a rules management system deployed on said computing infrastructure.

* * * * *